ADAM SNYDER.
Improvement in Wagon Brake.
No. 124,636.                               Patented March 12, 1872.
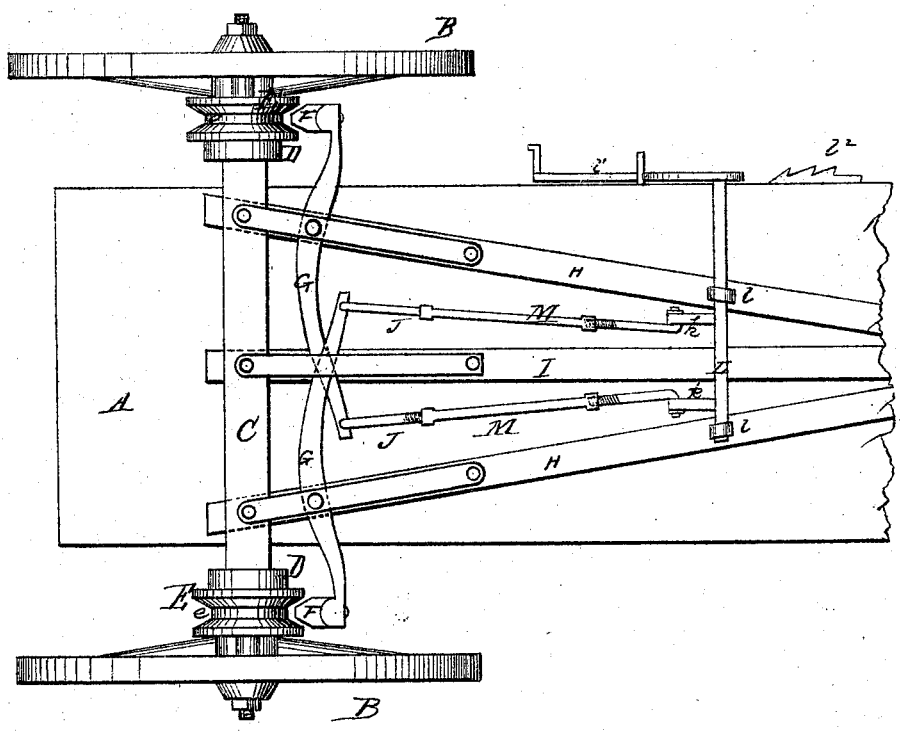

UNITED STATES PATENT OFFICE.

ADAM SNYDER, OF KNOX TOWNSHIP, OHIO.

IMPROVEMENT IN WAGON-BRAKES.

Specification forming part of Letters Patent No. 124,636, dated March 12, 1872.

*To all whom it may concern:*

Be it known that ADAM SNYDER, of Knox township, in the county of Vinton and State of Ohio, has invented a new and valuable Improvement in Wagon, Buggy, or Express Brakes; and he does hereby declare that the following is a full, clear, and exact description of the construction and operation of the same, reference being had to the annexed drawing making a part of this specification, and to the letters and figures of reference marked thereon.

Figure 1 of the drawing is a representation of an under-side plan view of a wagon having my improved brake.

This invention has relation to wagon-brakes; and the novelty consists in the application to the wheel-hubs of grooved wheels which the brake-shoes fit, and in the construction and arrangement of devices for operating the brake, as hereinafter described.

In the accompanying drawing illustrating this invention, A represents the bottom of a wagon, carriage, or other vehicle. B represents the hind wheels, and C the hind axle. D designates the hubs of the wheels B, each of which is provided on the inside of the wheel with a wheel, E, having a double-beveled circumferential groove, $e$; or, instead of a wheel, a pair of beveled flanges, turned in constructing the hub. F indicates the brake-shoes, which are shaped to fit the grooves $e$. They are attached to the outer ends of arms G, which are pivoted to the wagon-hounds H, and, crossing each other below the reach-pole I, are coupled to rods J, which are connected to studs or cranks $k$ projecting from a transverse shaft, L. The latter is journaled in loops or boxes $l$, and is provided with an operating-handle, $l^1$, engaging with a rack, $l^2$, on the side of the wagon. The moving of the handle $l^1$ throws the shoes into or out of contact with the grooved wheels. M indicates shackles on the rods J, which are of use for the purpose of regulating the tension of the brake.

The grooved wheels may be made removable, so that when worn they may be replaced. Their utility is obvious. Being grooved, they give a better purchase to the brake-shoes and allow more force to be applied in arresting the revolution of the wheels B.

I claim as my invention—

1. The removable grooved wheels E attached to the hubs D on inner face of the wheels of a wagon or carriage, and used in connection with the brake-shoes, as and for the purpose specified.

2. The combination of the grooved wheels E, corresponding brake-shoes F, arms G, rods J, adjusting-shackles M, and shaft L, as and for the purpose specified.

In testimony that I claim the above I have hereunto subscribed my name in the presence of two witnesses.

ADAM SNYDER.

Witnesses:
D. J. CANNY, Jr.,
ANGUS McCOY.